United States Patent [19]

Taylor

[11] 4,428,243
[45] Jan. 31, 1984

[54] FLOWMETERS

[76] Inventor: Lionel I. A. Taylor, Copythorne House, Copythorne, Southampton, England

[21] Appl. No.: 321,312

[22] Filed: Nov. 13, 1981

[51] Int. Cl.³ .............................................. G01F 1/10
[52] U.S. Cl. .................................................. 73/861.77
[58] Field of Search ................... 73/861.77, 861.79; 324/175; 250/574, 577

[56] References Cited

U.S. PATENT DOCUMENTS

| | | | |
|---|---|---|---|
| 3,021,710 | 2/1962 | Barrere et al. | 73/861.77 |
| 3,217,539 | 11/1965 | Owen et al. | 73/861.77 |
| 3,729,047 | 4/1973 | Bohnlein et al. | 324/175 |
| 3,871,215 | 3/1975 | Pratt, Jr. et al. | 73/861.34 |
| 4,013,953 | 3/1977 | Skala | 73/861.77 |
| 4,282,883 | 8/1981 | Yerushalmy | 73/861.77 |
| 4,355,238 | 10/1982 | Ruell | 250/577 |

FOREIGN PATENT DOCUMENTS 2245950 4/1975 France ................................ 324/75

*Primary Examiner*—Herbert Goldstein
*Attorney, Agent, or Firm*—Browdy and Neimark

[57] ABSTRACT

A flowmeter in which a bladed rotor element is mounted in a bore formed in a body so that the element rotates at a speed representative of the rate of flow of a fluid along the bore. Electromagnetic radiation is directed from a source into the bore and a radially outer face of each blade on the rotor element moves across the path of the radiation once during each rotation of the element. Radiation reflected by the outer faces of the blades is directed to a photosensitive detector. Direction of radiation towards the element and direction of reflected radiation towards the detector is effected by means which comprise at least one elongated guide member having a refractive index greater than the refractive index of the medium in which the member is disposed. The or each guide member is preferably formed integrally with the body in which the bore is formed.

8 Claims, 7 Drawing Figures

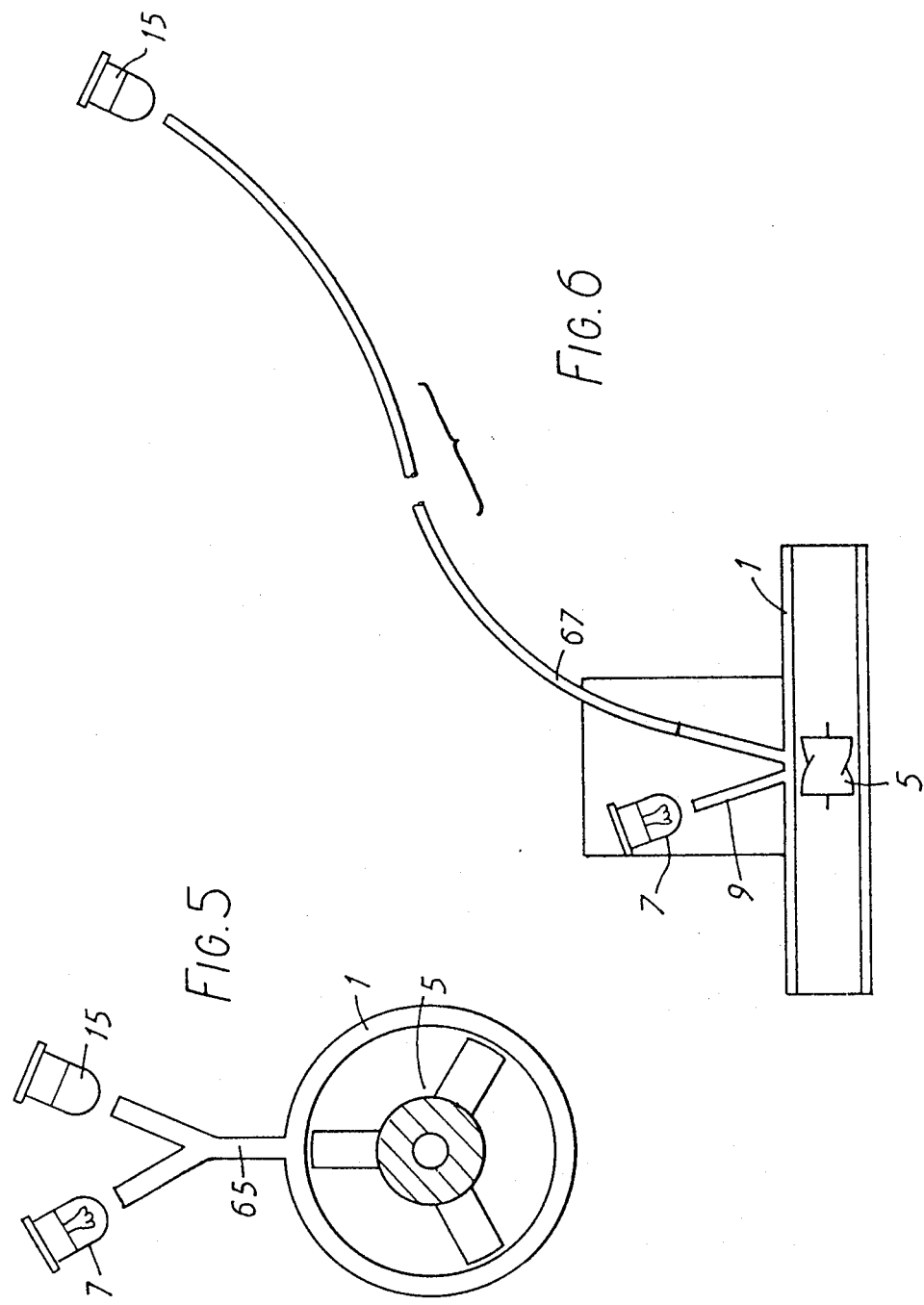

FLOWMETERS

FIELD OF THE INVENTION

This invention relates to flowmeters.

BACKGROUND OF THE INVENTION

A flowmeter suitable for measuring the rate of supply of fuel to a petrol engine or the rate of supply of spraying liquid to the boom of agricultural or horticultural spraying equipment includes a bladed rotor element which is rotated by liquid passing through the meter, the speed of rotation being proportional to the rate of flow. Such flowmeters may be required to operate over a range of flow rates from 0.25 to 30 gallons per hour. The lower end of the range dictates that the maximum diameter of the bore in which the rotor element is mounted should be generally less than 0.25 inches.

At low flow rates there is an unacceptable drag effect if an electromagnetic device is used for sensing the speed of rotation of the rotor element. Although an inductive sensor overcomes this problem, the element must be made of metal, or must include a metallic insert. It is then costly to manufacture the element from a metal which is corrosion resistant and the element is heavy, which means higher bearing friction and hence poor flow rate characteristics. It is preferable therefore to make the rotor element of a plastics material, which offers the advantage of low cost, low weight, low production spread in terms of dimensional accuracy, and a choice of materials which have suitable chemical and physical properties.

To detect the speed of rotation of the rotor element an optical sensing device has been proposed as an alternative to an inductive or electromagnetic device. In the optical device a beam of light is transmitted across the bore so that it is interrupted by the rotating blades of the rotor element. A photodetector to which the beam is applied generates an electrical signal of frequency representing the frequency at which the beam is interrupted, and hence the speed at which the element is rotated. For satisfactory operation, this optical device relies upon a high degree of transparency of the liquid passing through the meter. Further, spurious signals are produced if the liquid includes gas bubbles which interrupt the light beam. It is found that there may be errors of up to 25%, particularly if the "lens effect" of liquid within the bore is used to focus the light beam on to the photodetector.

SUMMARY OF THE INVENTION

According to the present invention there is provided a flowmeter comprising a bladed rotor element mounted in a bore formed in a body so that fluid flowing through the bore causes the element to rotate at a speed representative of the rate of flow of the fluid, a source of electromagnetic radiation, means for directing radiation from the source into the bore and towards the rotor element so that a radially outer face of at least one rotor blade moves across the path of the radiation during each rotation of the rotor element, a detector of electromagnetic radiation, and means for directing radiation reflected by the said face of the or each blade to the detector, the means for directing radiation from the source and the means for directing reflected radiation comprising at least one elongated guide member having a refractive index greater than the refractive index of the medium in which the member is disposed.

Preferably, the or each guide member is formed integrally with the said body.

The means for directing radiation from the source and the means for directing reflected radiation may comprise respective first and second elongated guide members, each having a refractive index greater than the refractive index of the medium in which the member is disposed.

Alternatively, the means for directing radiation from the source may comprise a limb and the body of a generally Y-shaped guide member having a refractive index greater than the refractive index of the medium in which the member is disposed, and the means for directing reflected radiation then comprise the other limb and the body of the generally Y-shaped guide member.

Preferably, the part of the or each blade from which radiation is reflected to the detecting means has a higher coefficient of reflection than a hub upon which the blade or blades is supported.

Suitably, the part of the or each blade from which radiation is reflected is adjacent to a side wall through which the radiation enters the bore during the time within which radiation is reflected therefrom, whereby the radiation travels only a short distance through fluid flowing through the bore.

The or each guide member may comprise a rod of glass or plastics material.

The electromagnetic radiation is suitably visible or infrared radiation.

BRIEF DESCRIPTION OF THE DRAWINGS

The invention will now be described, by way of example, with reference to the accompanying drawings, in which:

FIGS. 3, 6 and 7 are diagrammatic side elevations of further flowmeters according to the invention; and FIGS. 4 and 5 are transverse sections of further flowmeters according to the invention.

DESCRIPTION OF PREFERRED EMBODIMENTS

Figure 1:
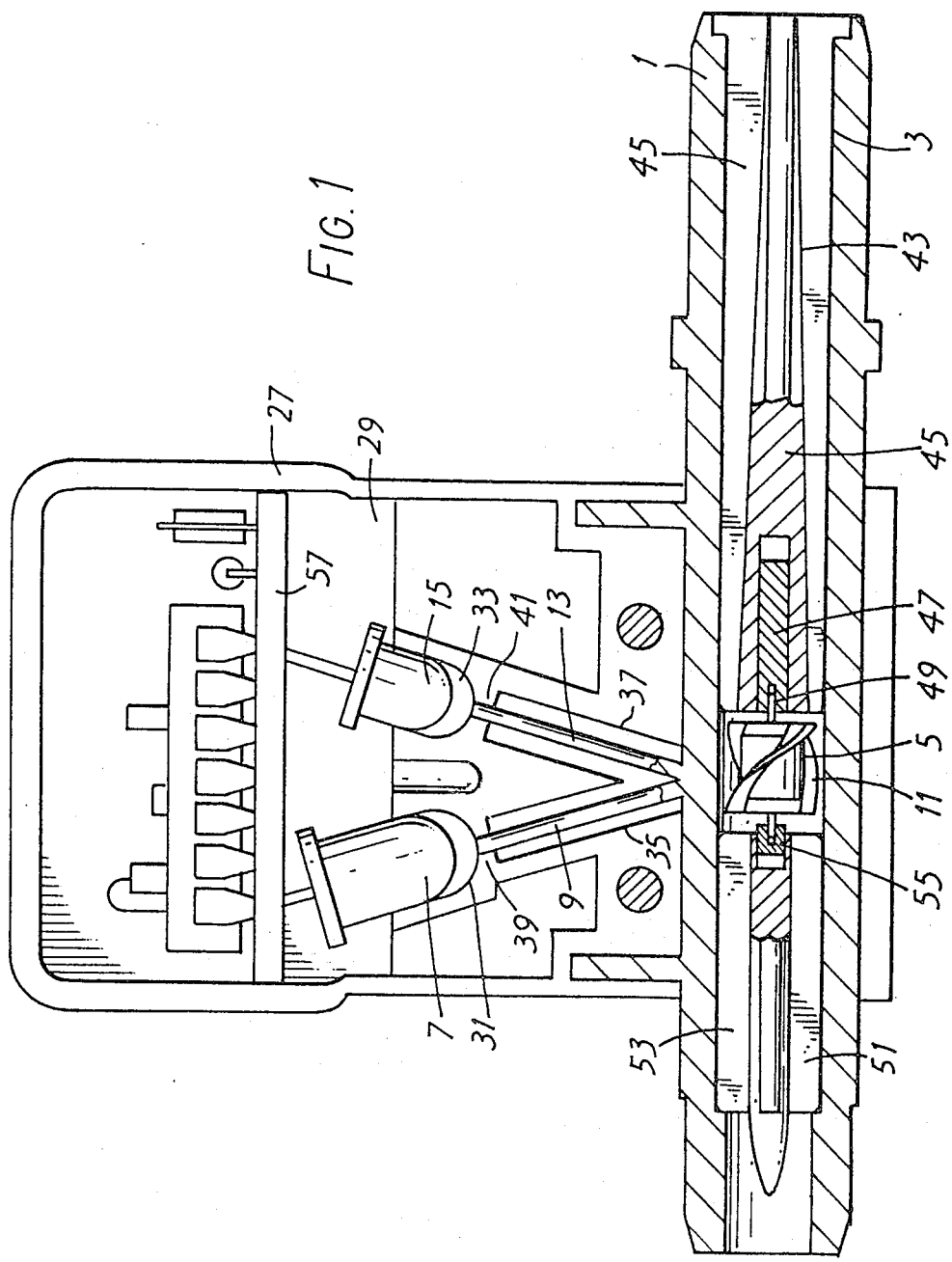
FIG. 1 is a plan view of a flowmeter according to the invention, part of a housing of the flowmeter being removed.

The flowmeter shown in FIG. 1 of the drawings is suitable for use in measuring the rate of supply of fuel to a petrol engine or the rate of supply of spraying liquid to a boom in agricultural or horticultural spraying equipment. Included in this flowmeter is a tubular body 1 which, in use, is connected into a line along which the fuel or spraying liquid is passed. Within a bore 3 of the body 1 is a bladed rotor element 5 so arranged that liquid flowing through the bore causes the element to rotate at a speed proportional to the rate of flow of liquid. For measuring the speed of rotation, a light source 7 is mounted outside the body 1 and a guide member 9 is arranged to direct a beam of light from the source into the bore 3 so that a radially outer face of each blade 11 on the element 5 moves across the beam once during each rotation of the element. Light reflected from a radially outer face of each blade 11 is directed by a further guide member 13 to a photosensitive detector 15 which produces an electrical output signal whose frequency is proportional to the speed of rotation of the element 5, and hence proportional to the rate of flow of liquid.

Figure 2:
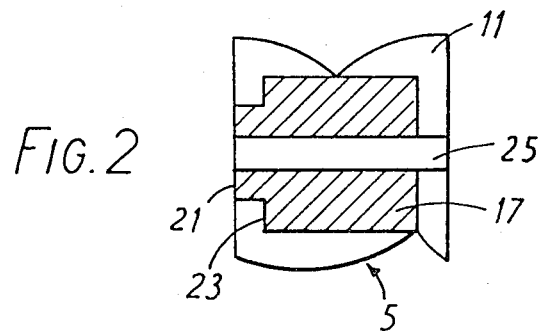
FIG. 2 is an axial section of a rotor element in the flowmeter of FIG. 1.

FIG. 2 shows an axial section of the rotor element 5 in the flowmeter of FIG. 1. The element 5 includes a hub 17 which is moulded from a plastics material having a low coefficient of reflection, preferably black material. Supported by the hub 17 are three helical blades 11 of a plastics material having a high coefficient of reflection, preferably a white plastics material or a plastics material impregnated with a reflective substance to produce a highly reflective surface.

Referring now to FIG. 1, each of the light guide members 9 and 13 is moulded integrally with the tubular body 1, the axes of the members lying in a plane which includes the axis of the body 1 and the axis of the rotor element 5.

A housing 27 of opaque material houses the light source 7 and the photosensitive detector 15 and also receives the light guide members 9 and 13. The housing 27 is formed of a base part 29, shown in plan view in FIG. 1, and a cover part (not shown).

The base part 29 of the housing 27 is formed with cavities 31 and 33 for housing the source 7 and the detector 15, respectively, and with channels 35 and 37 for receiving respective members 9 and 13. An inner section 39 of the channel 35 has a reduced diameter which is only slightly larger than the diameter of the guide member 9 so that no light from the source 7 can reach the element 5 unless it has travelled via the guide 9. Similarly, an inner section 41 of the channel 37 has a reduced diameter for preventing reflected light other than light which travels along the guide member 13 from reaching the detector 15.

In the flowmeter of FIG. 1 the body 1 and guide members 9 and 13 are made of glass or transparent plastics material. The guide members 9 and 13 are about 1 mm diameter.

Upstream of the rotor element 5 (to the right as viewed in FIG. 1) is a flow straightener and rotor support 43. The support 43 has a central, generally cylindrical section 45, whose external diameter is smaller than the diameter of the bore 3, and four longitudinally extending ribs 45, which engage an inner surface of the bore 3. At one end of the section 45 is an insert 47, which serves as a bearing support for one end of a spindle 49 upon which the element 5 is mounted.

Downstream of the element 5 is a second flow straightener and rotor support 51, which likewise is formed with longitudinally extending ribs 53 and which has an insert 55 to provide a bearing support for the spindle 49.

The light source 7 and the detector 15 are electrically connected to electrical circuit components on a printed circuit board 57.

When the flowmeter of FIG. 1 is in use, liquid flowing through the bore 3 in the body 1 impinges against the blades 11 of the element 5 and causes the element to rotate. The speed of rotation is proportional to the rate of flow of liquid along the bore 3. A beam of light from the source 7 is directed into the bore 3 by the guide member 9 and is reflected into the further guide member 13 and on to the detector 15 each time one of the blades 11 moves across the beam, i.e. three times per revolution of the element 5. The detector 15 produces an electrical output signal which varies periodically at a frequency equal to the frequency at which pulses of radiation are applied thereto. The signal is applied via suitable circuits on the board 57 in the case of a simple flowrate indicator to a meter (not shown) which gives a reading representative of the frequency of the output signal, and hence representative of the speed of rotation of the element 5, and the rate of flow of the liquid along the bore 3.

Figure 3:
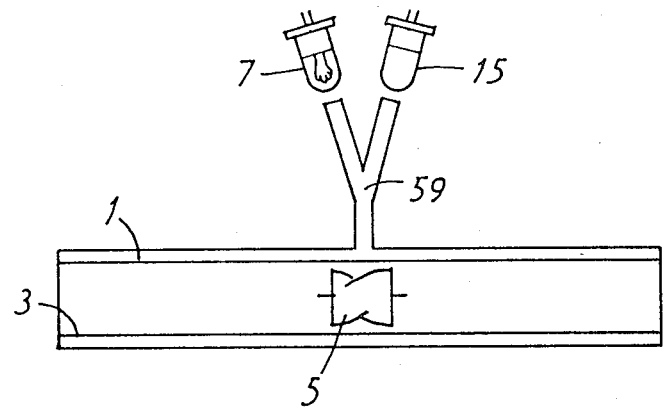

FIG. 3 is a second embodiment of the invention which has a tubular body 1, a rotor element 5, a light source 7 and a photosensitive detector 15 of the form shown in FIG. 1. In the flowmeter of FIG. 3, however, a Y-shaped guide member 59 replaces the guide members 9 and 13 of FIG. 1. This guide member 59 is arranged so that light from the source 7 travels along one limb and the body of the "Y" and enters the bore 3 of the body 1 in a radial direction. Light reflected from a radially outer face of each blade 11 on the rotor element 5 reenters the body of the member 59 and a part of this light then travels via a second limb of the "Y" to the detector 15.

The guide member 59 of FIG. 3 is moulded from transparent plastics material. The included angle between the two limbs of the "Y" is less than half the critical angle of the material in air so that light from the source 7 does not enter the second limb and interfere with the reflected light. Light can be directed accurately towards the element 5 by means of the member 59.

Figure 4:
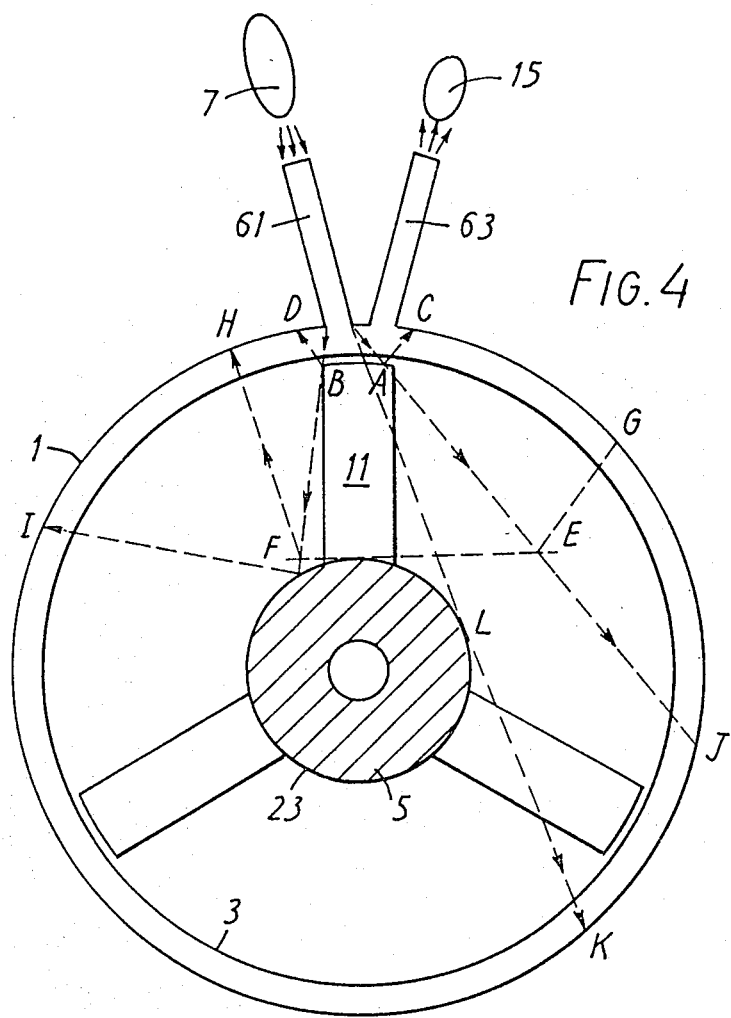

FIG. 4 is a section at right angles to the axis of a further flowmeter according to the invention which has a rotor element 5 and a tubular body 1 of the form shown in previous embodiments. Moreover, there are light guide members 61 and 63 which are formed integrally with the body 1. In the flowmeter of FIG. 4, however, the axes of the members 61 and 63 lie in a plane which is perpendicular to the axes of the rotor element 5 and the body 1.

Marked in FIG. 4 are the paths of rays of light which are incident upon the rotor element 5 and which are reflected therefrom at various angular positions of the element. First, there is a divergent cone of rays which emerges from the guide member 61 and impinges upon the radially outer face of a blade 11 when the element 5 is in the angular position shown in FIG. 4. The periphery of the cone is indicated by the points A and B. Light reflected from the blade 11 diverges further and illuminates a generally circular area of the wall of the bore 3 in the body 1, designated by the points C and D in FIG. 3. Part of this reflected light enters the guide member 63 and is directed towards the detector 15.

When the element 5 has rotated from the position shown in FIG. 4, light from the member 61 impinges upon the hub 23 of the element, illuminating an area of the hub whose periphery is indicated by the points F and L. From the hub 23 the light is reflected on to an area of the bore 3 extending angularly between the points I and K. The arc IK is approximately 205° whilst the arc CD is only approximately 18°. There is therefore a ratio of approximately 11:1 between the area of the bore 3 illuminated by the reflected light when the element 5 is in the angular position shown in FIG. 4 and the area illuminated when the element has been rotated from this position.

FIG. 5 is an embodiment of the invention wherein the guide members 61 and 63 of FIG. 4 are replaced by a Y-shaped guide member 65 corresponding to the guide member 59 of FIG. 3. The member 65 is formed integrally with the body 1 and is arranged with the axes of the body and limbs of the member in a plane perpendicular to the axis of the body 1 and the rotor element 5.

FIG. 6 is an embodiment suitable for use with a tubular body 1 and rotor element 5 thereof at an ambient temperature greater than the temperature at which a photosensitive detector 15 can be operated. In this embodiment the detector 15 is located remotely of the body 1 and the rotor element 5. Light reflected from the element 5 is guided to the detector by means of a plastics or glass optical guide member 67 of extended length.

The guide member 67 has a short initial section which is made of glass or thermoplastic material and is formed intergrally with the body 1. Connected to this initial section is an elongated section made of a series of glass fibre optical guides or of thermoplastics material.

Figure 7:
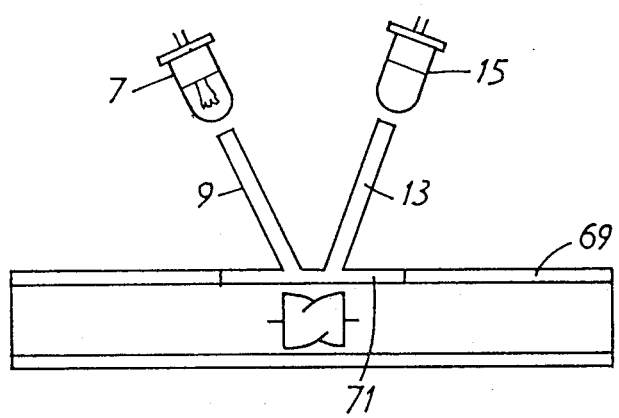

In FIG. 7 of the drawings there is an embodiment which corresponds to the embodiment of FIG. 1 except that the body 1 is replaced by an opaque tubular body 69 having a window 71 of transparent material through which radiation can be transmitted to and from the element 5. Guide members 9 and 13 are formed integrally with the window 71.

In further embodiments a photosensitive detector and a light source are both remote from the rotor element and the body containing the element. In one of these embodiments there is a single extended light guide, formed integrally with the body, which is connected to a Y-shaped guide member. In another embodiment there is a first extended guide member for directing light from the source to the rotary element and a further extended guide for directing reflected light to the detector. At least part of each guide member is formed integrally with the body 1 housing the rotary element.

In the embodiments described above the axes of the light guide members are disposed in a plane which includes the axis of the body 1 or is perpendicular thereto. It will be appreciated that alternative arrangements can be employed. For example, the guide members can be arranged with the axes of the guides lying in a plane which is inclined at 45° to the axis of the body 1.

It will be appreciated that a rotor element having a hub and a plurality of radially extending blades can be used in place of the element 1 with helical blades described above. The tubular body 1 can be made of opaque material having glass or plastics windows through which light is directed on to the rotor element. Infra-red or ultraviolet radiation can be used instead of visible radiation.

The guide member or members can be made separately from the body 1 and secured thereto by adhesive, care being taken to avoid loss of light due to internal reflections and refraction. In some cases it may be possible to have the guide member or members spaced a short distance from the body 1.

I claim:

1. A flowmeter comprising a bladed rotor element mounted in a bore formed in a body so that fluid flowing through the bore causes the element to rotate at a speed representative of the rate of flow of the fluid, a source of electromagnetic radiation, means for directing radiation from the source into the bore and towards the rotor element so that a radially outer face of at least one rotor blade moves across the path of the radiation during each rotation of the rotor element, a detector of electromagnetic radiation, and means for directing radiation reflected by the said face of each blade to the detector, the means for directing radiation from the source and the means for directing reflected radiation comprising at least one elongated guide member having a refractive index greater than the refractive index of the medium in which the member is disposed, each guide member being formed integrally with at least a portion of the said body.

2. A flowmeter as claimed in claim 1, wherein the means for directing radiation from the source and the means for directing reflected radiation comprise respective first and second elongated guide members, each having a refractive index greater than the refractive index of the medium in which the member is disposed.

3. A flowmeter as claimed in claim 1, wherein the means for directing radiation from the source comprises a limb and the body of a generally Y-shaped guide member having a refractive index greater than the refactive index of the medium in which the member is disposed, and the means for directing reflected radiation comprises the other limb and the body of the generally Y-shaped member.

4. A flowmeter as claimed in claim 1 or claim 3, wherein the axis of each guide member lies in the same plane as the axis of the bore in the body.

5. A flowmeter as claimed in claim 1 or claim 3, wherein the axis of each guide member lies in a plane perpendicular to the axis of the bore in the body.

6. A flowmeter as claimed in claim 1 or claim 3, wherein the part of each blade from which radiation is reflected to the detecting means has a higher coefficient of reflection than a hub upon which the blade or blades is supported.

7. A flowmeter as claimed in claim 1 or claim 3, wherein the means for directing radiation into the bore and/or the means for directing reflected radiation further comprise an elongated optical fibre, whereby the source and/or the detector can be disposed remotely of the rotor element.

8. A flowmeter as claimed in claim 1 or claim 3, wherein the said body is made of a material opaque to the said radiation, and said portion comprises a window of a material through which the radiation is transmitted.

* * * * *